July 14, 1942.                A. F. STEPHEN                2,289,466
                        BICYCLE STOP-LIGHT SWITCH
                           Filed June 3, 1940
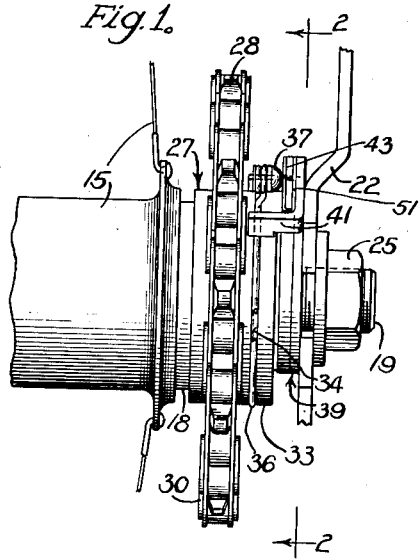
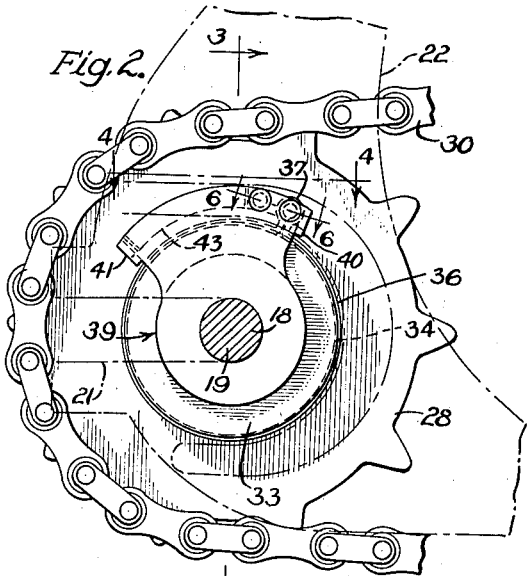
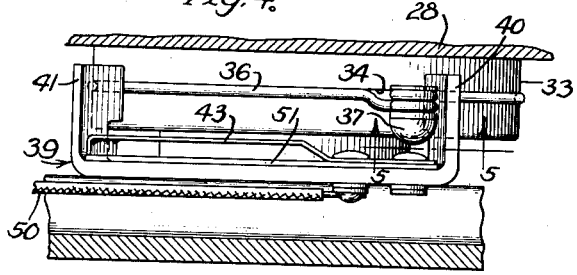
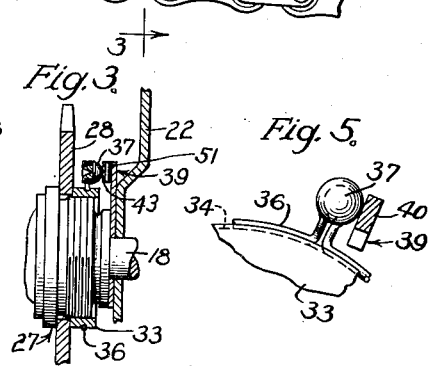
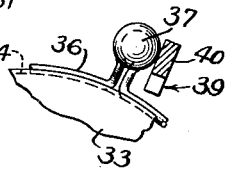
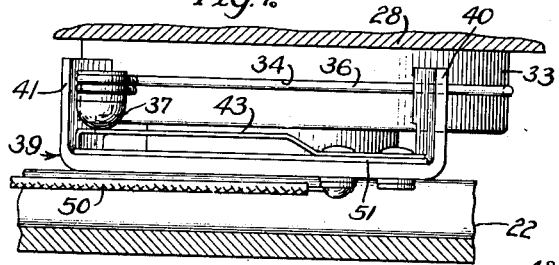
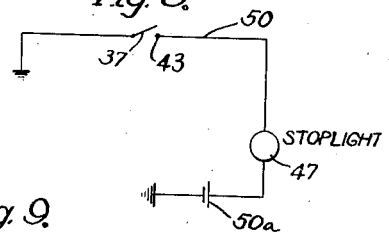
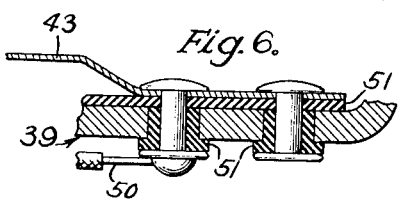
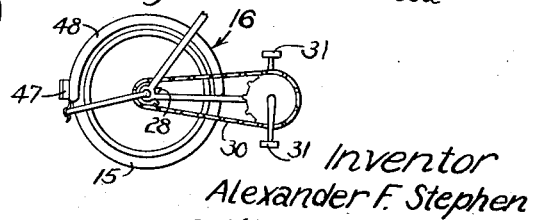
Inventor
Alexander F. Stephen
Attorney Patented July 14, 1942

2,289,466

UNITED STATES PATENT OFFICE 2,289,466

BICYCLE STOP LIGHT SWITCH

Alexander F. Stephen, Oak Park, Ill., assignor to Sears, Roebuck and Co., Chicago, Ill., a corporation of New York Application June 3, 1940, Serial No. 338,460

4 Claims. (Cl. 200—59)

This invention relates to signal devices, and is concerned more particularly with lights and other signals controlled by the rider of a vehicle of the pedal-operated type.

It is an object of my invention to provide a signal responsive to a part of the operative mechanism of a pedal-propelled vehicle.

Another object involves the provision of a signaling device on a vehicle propelled by a rider thereon, the operation of which device is dependent upon the actuating part of the person.

A further object is to provide in a pedal-propelled vehicle a signal dependent for its operation upon the propelling limbs of the rider.

A still further object resides in the provision in a pedal-propelled vehicle, of a coaster-brake-controlled stop-light or other signal.

Further objects and advantages of the invention will appear as the description proceeds.

The invention will be better understood upon reference to the following description and accompanying drawing, in which:

Fig. 1 is a fragmentary rear end elevation of a tractive wheel of a bicycle or the like equipped with a signal mechanism according to one form of my invention, looking from the left in Fig. 2.

Fig. 2 is a fragmentary sectional view taken as indicated by the line 2—2 in Fig. 1.

Fig. 3 is a fragmentary sectional view taken as indicated by the line 3—3 in Fig. 2.

Fig. 4 is an enlarged fragmentary plan view taken as indicated by the line 4—4 in Fig. 2.

Fig. 5 is a fragmentary sectional view taken as indicated by the line 5—5 in Fig. 4.

Fig. 6 is an enlarged fragmentary sectional view taken as indicated by the line 6—6 in Fig. 2.

Fig. 7 is a view similar to Fig. 4 but with the parts in a different relation.

Fig. 8 is a circuit diagram of the invention.

Fig. 9 is a reduced elevation showing a portion of a bicycle equipped in accordance with my invention.

Referring more particularly to the drawing, I have shown at 15 a wheel, such as the rear wheel of a bicycle 16, mounted about an axle 18 whose ends, one of which is shown at 19, extend through the slots 21 of frame hanger brackets 22, nuts 25 serving to retain the brackets in assembly with the axle.

Mounted on the wheel is a coaster brake 27, the interior details of which are not shown, as they form no part of this invention. As is conventional, a sprocket 28 affords the means by which the vehicle is driven forward and by which the braking force is applied, and to that end a sprocket chain 30 provides the drive from the pedals 31 to the sprocket.

In accordance with my invention, the sprocket is maintained on the axle as by a round nut 33 which has a continuous peripheral groove 34 in which a slip spring ring 36 is frictionally engaged, so that the ring rotates with the sprocket unless restrained. The ring carries a contact button 37. A yoke 39 is fitted on the axle inwardly of the bracket or hanger 22 and is clamped in place by said nut 25. The yoke 39 has spaced stops or abutments 40 and 41 disposed to engage the button so as to limit forward and reverse movements, respectively of the button and associated ring with the sprocket. The yoke carries a preferably resilient contact 43 spaced from the stop 40 so that, when the sprocket is rotating forward, or is motionless without the application of the brake, the button is free of the contact 43, but when the brake is applied the sprocket is moved reversely, thereby carrying the button into engagement with the contact 43, beyond which the button cannot move, on account of the stop 41. The contact 43 is adapted to yield to the pressure of the button merely enough to insure engagement therebetween, and not sufficiently to overcome the friction between the button ring 36 and the nut 33.

A stop-light 47 may be mounted as on the rear fender 48 or at any other suitable point, and is connected as by wiring 50 with a battery 50a and with the contact 43, suitably insulated as at 51 from the yoke 39, the stop-light 47 and button 37 being grounded as to the frame or fender to complete an electric circuit, which, as is evident from the foregoing, is open when the brake is not applied and closed when the brake is applied. Of course, any signal other than a stop-light may be employed. A suitable detachable cover (not shown) may be employed to protect the electric contacts from moisture, etc.

It is evident from the foregoing that I have provided a signal apparatus which is extremely simple, involving little motion and a minimum of parts, substantially all of which may be made rugged and at low cost, and in assembly are readily accessible for inspection, repair and replacement, and which is generally satisfactory for the purpose desired.

Various modifications may suggest themselves to those skilled in the art without departing from the spirit of my invention, and, hence, I do not wish to be restricted to the specific form shown or uses mentioned, except to the extent indicated in the appended claims, which are to be interpreted as broadly as the state of the art will permit.

I claim:

1. In a pedal-propelled vehicle including a rear axle, a coaster brake thereon, and a sprocket included in said brake: a nut maintaining said sprocket on said axle and having an outer peripheral circumferential groove, a ring sprung in said groove so as to tend by friction to rotate with said nut but capable of slipping and being held from turning, spaced abutments in the path of a portion of said ring in each direction for confining said ring to a limited range of rotation, said ring portion having a contact, a spring track along which said contact rides throughout a part, only, of its range of movement, said track, when engaged with said contact, exerting spring pressure on said contact to secure adequate engagement therebetween, said track and contact constituting a switch for an electric signal circuit and being arranged to close said switch only when the brake is applied.

2. In a bicycle or the like having a frame and including a coaster brake and a sprocket, a member frictionally mounted so as to tend to rotate with the sprocket, said member carrying a contact button, a U-shaped bracket mounted on said frame and having on its bight portion a leaf spring slidably engageable with spring pressure with said button throughout a substantial arc of rotation of said button, the arms of said bracket serving as abutments confining said button to travel through an arc exceeding the length of and including the aforesaid arc, and means insulating said spring from one of said arms, the parts being so constructed and arranged that said button engages said spring and the other arm when the brake is on and engages one of said arms free of said spring when the bicycle is pedaled forward.

3. In a pedal-propelled vehicle including a coaster brake: a part rotatable in response to pedal operation and having an outer peripheral circumferential groove, a ring sprung in said groove so as to tend by friction to rotate with said part but capable of slipping and being held from turning, spaced abutments in the path of a portion of said ring in each direction for confining said ring to a limited range of rotation, said ring portion having a contact, a spring track along which said contact rides throughout a part, only, of its range of movement, said track, when engaged with said contact, exerting spring pressure on said contact to secure adequate engagement therebetween, said track and contact constituting a switch for an electric signal circuit and being arranged to close said switch only when the brake is applied.

4. In a bicycle or the like having a frame and including a coaster brake and a part rotatable in response to pedal operation, a member frictionally mounted so as to tend to rotate with said part, said member carrying a contact button, a U-shaped bracket mounted on said frame and having on its bight portion a leaf spring slidably engageable with spring pressure with said button throughout a substantial arc of rotation of said button, the arms of said bracket serving as abutments confining said button to travel through an arc exceeding the length of and including the aforesaid arc, and means insulating said spring from one of said arms, the construction and arrangement being such that said button engages said spring and the other arm when the brake is on and engages one of said arms free of said spring when the bicycle is pedaled forward.

ALEXANDER F. STEPHEN.